Oct. 17, 1933.     H. E. HERSHEY     1,930,517
REMOTE CONTROL SYSTEM
Original Filed May 4, 1928     3 Sheets-Sheet 1

Inventor
Harry E. Hershey
Wm Walter Owen Atty.

Oct. 17, 1933.   H. E. HERSHEY   1,930,517
REMOTE CONTROL SYSTEM
Original Filed May 4, 1928   3 Sheets-Sheet 3
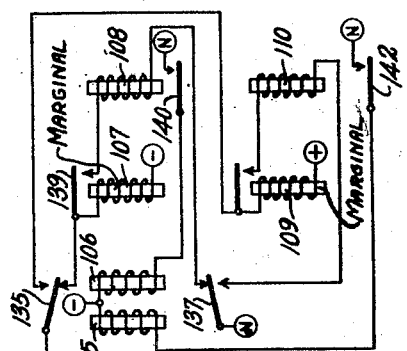
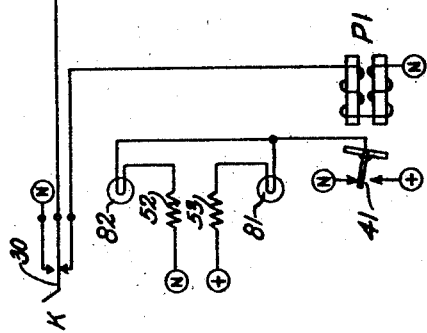
Fig. 3
Inventor
Harry E. Hershey
Atty.

Patented Oct. 17, 1933

1,930,517

UNITED STATES PATENT OFFICE 1,930,517

REMOTE CONTROL SYSTEM

Harry E. Hershey, Oak Park, Ill., assignor, by mesne assignments, to Associated Electric Laboratories, Inc., Chicago, Ill., a corporation of Delaware Original application May 4, 1928, Serial No. 275,027. Divided and this application January 6, 1930. Serial No. 418,744

5 Claims. (Cl. 177—311)

This invention relates in general to remote control systems, more particularly to such systems in which a plurality of substations are controlled in tandem over a trunk line, and the principal object of the invention, briefly stated, is the production of a new and improved system of this type, the improvements tending to make the system more reliable in its operation without increasing its complexity and cost.

In the tandem systems devised heretofore, in which it was desired to both control and supervise devices at the substation, separate control and supervisory conductors were necessary in the trunk line, or if the same conductor served as a control and supervisory conductor, more than one contact in the banks of the selecting switches was required for each of the switching devices. This latter arrangement greatly reduced the total capacity, that is the total number of switching devices, for which the system could be utilized, because of the limited number of contacts which can be placed in a selector switch bank.

Accordingly as a further object of my invention, I provide a new and improved control and supervisory circuit, which operates over one conductor in the trunk line, through one contact in the selector switch bank to both control and supervise the switching devices in the substation.

Further objects of my invention, not specifically mentioned here, will be obtained from a reading of the detailed description and claims which follow.

This application is a division of Serial No. 275,027, filed May 4, 1928, which has resulted in Patent Number 1,888,267, November 22, 1932, wherein the improved stepping circuit shown is being claimed.

Figure 1:
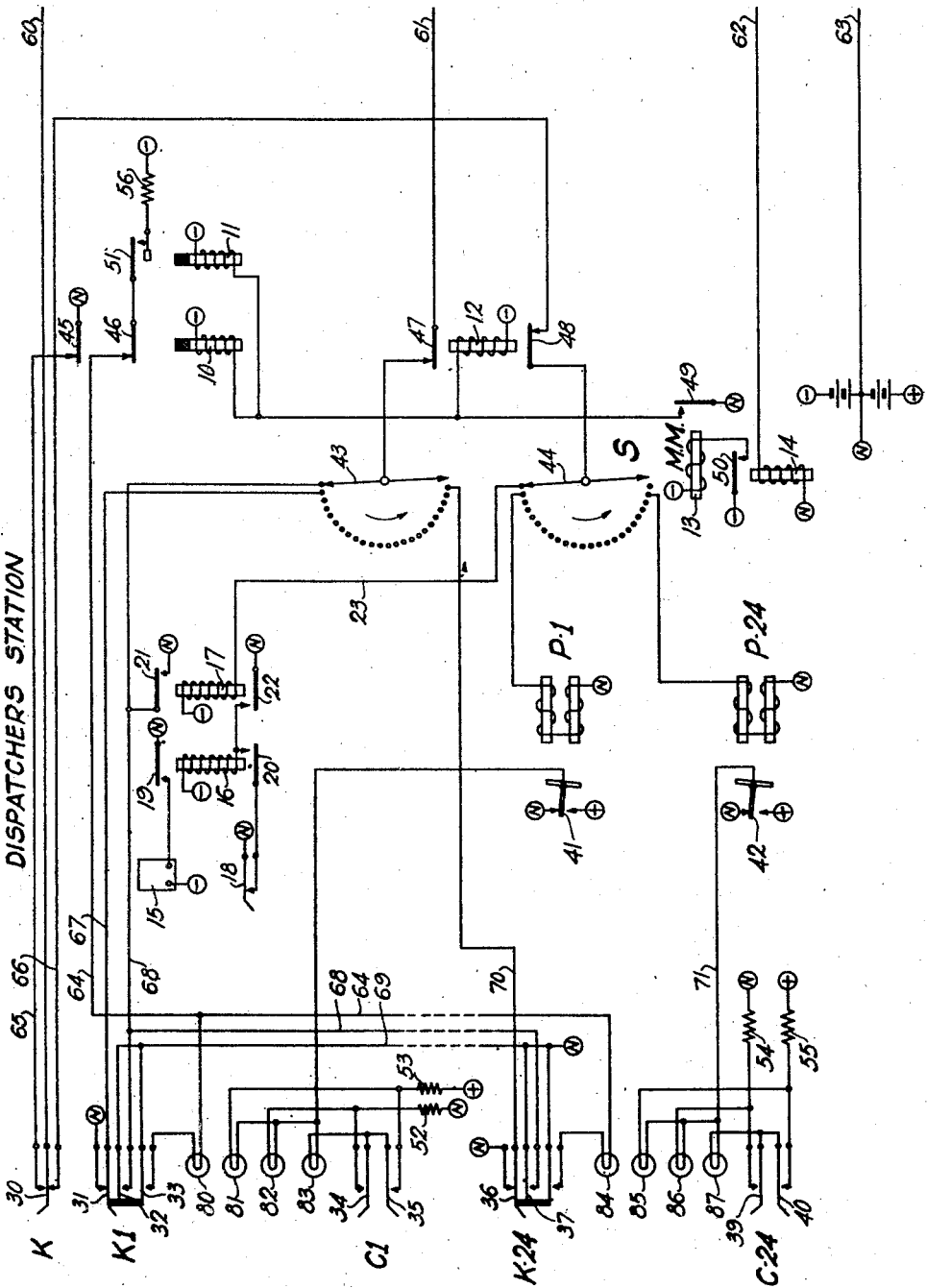
Figure 2:
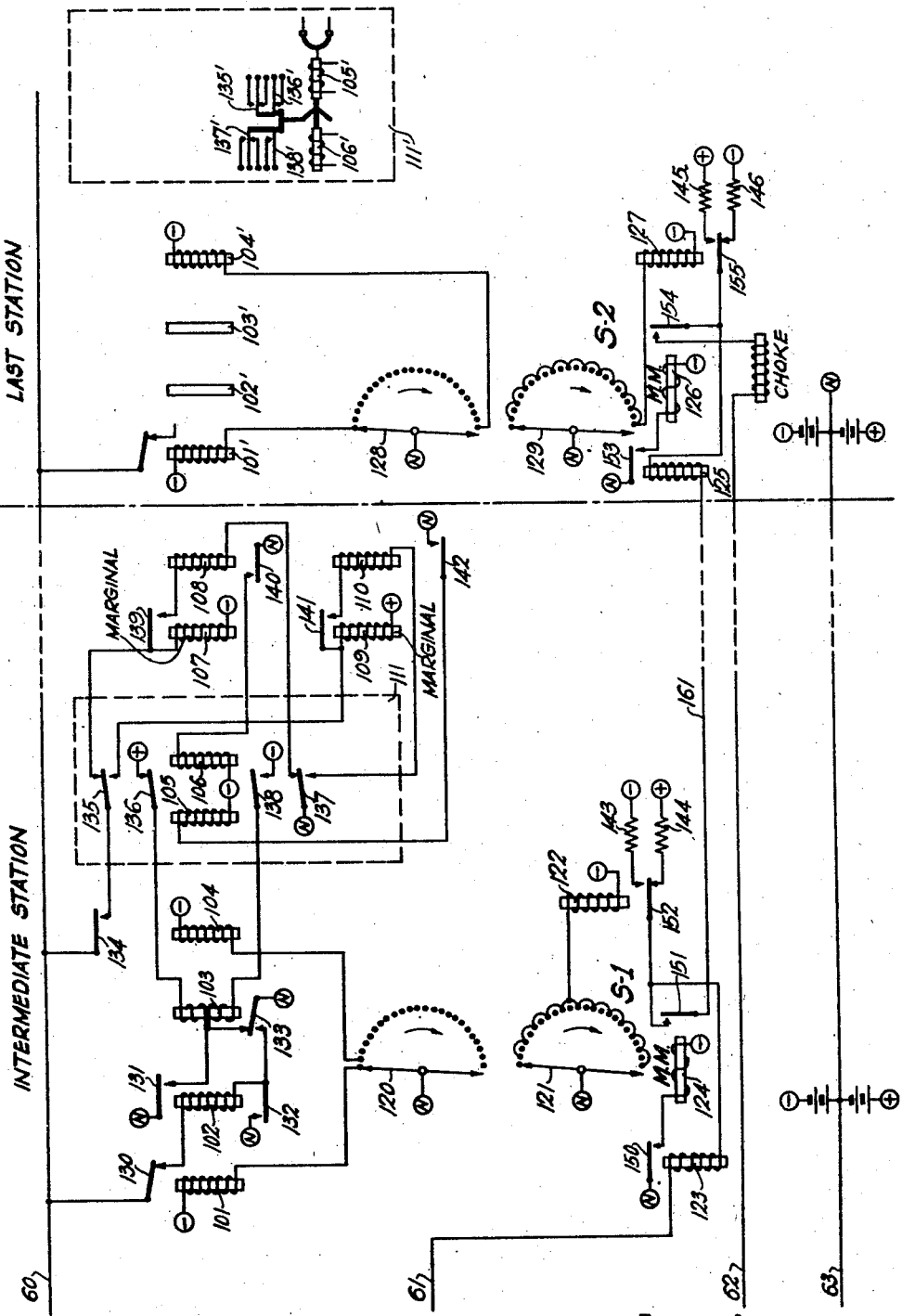

The drawings comprising Figs. 1 and 2, when arranged with Fig. 1 to the left of Fig. 2, with correspondingly numbered lines in alinement, show by the usual circuit symbols sufficient apparatus to enable a clear understanding of my invention. Fig. 3 shows a schematic arrangement for controlling and supervising devices in one station.

Fig. 1 shows the equipment located at the dispatcher's station, which equipment comprises a dispatcher's key shelf including keys K, K1 to K24, and C1 to C24, inclusive. The sender switch S, is controlled from the key shelf to transmit over the trunk line a selecting signal, which operates the selecting switches in the substation to position one of them upon an operative contact through which a device in that substation is controlled and supervised. The sender switch S, and the selecting switches in the substations are of the type of the well known rotary line switch, whose banks have a capacity of 25 or 50 contacts, and whose wipers are moved when the magnet deenergizes, rather than when it energizes.

Fig. 2 shows the equipment located in two of the substations on the trunk, an intermediate substation and the last substation on the trunk. The device 111, which is assumed to be one of the switching devices that it is desired to control and supervise over this system, is selected through the banks of the selector switch S1, which mechanically is like the sender, and which is stepped by impulses sent out from the sender. The device 111, which may be a circuit breaker, railway switch, semaphore, or any other electromagnetic device having two or more positions, is shown as a simple polarized relay, this showing being made by means of an example only, illustrates the principles of operation without undue complication of the drawings by including a group of equipment with which this invention is not particularly concerned.

The device to be operated, has two electromagnets 105 and 106, one moving it to its operated position when energized, the other moving it to its normal position when energized. The device is also equipped with the spring contacts or toggle switch 135 to 138, inclusive, which springs rest against the uppermost contacts when the device is in its operated position, and against their lowermost contacts when the device is in its normal position.

Associated with the device to be operated, are the control relays 107 and 108, which are operated to move the device to its normal position, and control relays 109 to 110 which are operated to move the device to its operated position. The selecting relay 104, is energized from a contact in the bank of the selecting switch S1, to select the particular device 111. Relays 101 to 103, inclusive, are supervisory relays, through the operation of which the selecting switches are stepped over their banks responsive to an automatic operation of the device 111.

The equipment in the last station on the trunk line comprises a selecting switch S2, relays 101' to 110', inclusive, through the operation of which the device 111' is selected and operated. This equipment is duplicate of that shown in the intermediate station, and is, therefore, not shown in detail in the drawings. The device 111' shows diagrammatically the actual construction of the devices to be operated.

The dispatcher's station is connected to the substations by means of a four conductor trunk, comprising the control and supervisory conductor 60, impulsing conductor 61 and 161, impulsing conductor 62, and the battery common conductor 63. In some installations, it may be possible to replace this latter conductor 63 by a ground connection, if bothersome ground potentials are not encountered. The number of conductors remains the same regardless of the number of substations on the trunk line.

For the sake of illustration, the device 111 is assumed to be reached through the first bank contact of the selecting switches, and the device 111' in the last substation on the trunk is selectable through the 24th bank contact. If a 50 point switch is used, in all probability the devices in the last substation of a trunk would be reached through the last few contacts, that is some place between the 45th and 50th contacts in the bank, but since the 50 point switch is mechanically the same as the 25, the 25 point switch is shown as it greatly simplifies the drawings.

In order to illustrate the operation of the system, assume that the dispatcher desires to select device 111. He operates the key K1, which starts the sender S stepping the selector switches S1, S2, etc. Responsive to the operation of key K1, the line relay associated with the selector switch S1 is energized, energizes the motor magnet of the switch S1. When the motor magnet is in its energized position it closes a circuit to the line relay of the second selector on the trunk line, not shown, which line relay energizes its respective motor magnet. That motor magnet energizes the line relay of the next selector on the trunk line, this process continuing until the last selector on the trunk line is energized. The energization of this selector, closes a circuit for the line relay of the sender S at the dispatcher's station, which line relay energizes to close the circuit of the motor magnet of S. The energization of motor magnet of S, opens the circuit of the line relay in the first substation, permitting that line relay to fall back and open the circuit of the motor magnet. The motor magnet advances the wipers of the selecting switch, and opens the line relay of the next substation on the trunk, which line relay falls back and opens the circuit of its respective motor magnet. When the motor magnet in the last substation on the trunk is deenergized, the circuit of the line relay of the selector is opened and that relay falls back to permit the motor magnet of the switch to fall back. The restoration of the motor magnet of the sender, again closes the circuit of the line relay of the first switch, and the cycle of operation is repeated. It will be seen that by this impulsing arrangement, the energization of the motor magnet in a substation is dependent upon the energization of the motor magnet in the preceding substation, and that the motor magnet of the sender switch is not energized until the motor magnets of all of the substations on the trunk line have been energized. The deenergization of each motor magnet depends upon the deenergization of the preceding motor magnet, and the deenergization of the motor magnet of the sender switch is not effected until the last switch on the trunk is deenergized. It will be noted that the relay 122 associated with the sender switch S1 is connected to the odd numbered bank contacts of the switch over which the wiper 121 rotates. It will also be noted that the relay 127 is similarly connected to the odd contacts in the bank of the switch S2 over which the wiper 129 rotates. With both of these relays in their normal positions, as they would be when the wipers are in their normal or even numbered positions, the circuit of the line relay 125 of the switch S2 includes positive battery through resistance 144 and the spring 152 of the switch S1, conductor 161, to negative battery through springs 155 and the resistance 146 of the switch S2. The relay will energize in this circuit. If, because of mechanical fault, wiper 129 is not advanced when the magnet 126 deenergizes, relay 127 will remain in its deenergized position, and if switch S1 operates properly, relay 122 will be energized. The circuit of line relay 125 will then run from negative battery through resistance 143 to the spring 152 to negative battery through spring 155 and resistance 146. Obviously the line relay 125 will not energize over this circuit, and the stepping will be stopped until the switch S2 is brought back into step with the remaining switches on the trunk.

Thus it will be seen, that this stepping circuit is positively synchronized, since each motor magnet depends for its energization upon the energization of the preceding motor magnet, and each magnet is deenergized by the deenergization of the preceding motor magnet, and moreover if the switches fail to properly step responsive to the deenergization of the motor magnet, the line relays of the switch succeeding is connected through a circuit which terminates at the same polarity of battery, and the relay does not energize.

During the interval that the selecting switches are stepping over the bank contacts, the selecting relays 104, 104', etc. are energized in turn. Responsive to the energization of the relay 104, a circuit is extended from the control relay of the device 111 to the control and supervisory conductor. If this device is in one position, this circuit will be energized by one polarity of battery, and if the device is in the opposite position, it will be energized by the opposite polarity of battery. At the dispatcher's station, the sender switch stepping in synchronism selects the polarized supervisory relays associated with the various devices at the substation, these relays being operated over this circuit in a direction depending upon the polarity of battery connected to the circuit. When a selected device is reached, it is first supervised by the application of the battery from the control relays, and then when the dispatcher throws the operating key K, it is operated over the same conductor. When the dispatcher restores the operating key, the new position of the device is supervised before the wipers leave the bank contacts through which the device was controlled. The supervisory polarized relays control a group of four lamp signals, three of which are used to indicate the position of the device, the fourth to indicate which device the selecting switch has selected.

Throughout the drawings I have shown a plurality of bus bar symbols, comprising a plus sign within a circle, a minus sign with a circle, and an N within a circle. At the bottom of the figures, conductor 63 is connected to the mid point of a battery, that connection being also labelled N or neutral. The plus and minus terminals are likewise marked. It is to be understood that the symbols used throughout the drawings correspond to those shown on the batteries, and are used to avoid unnecessary complication of the drawings.

Having thus described my invention in general, I will now proceed with a detailed description of its operation.

For the purpose of illustration, it will be assumed that the dispatcher desires to select, supervise, and control the device 111, which is located in an intermediate substation. The device 111 is selected by the operation of relay 104, which relay is connected to the first bank contact of the selecting switch S1. Therefore, to select this device it will be necessary for the selecting switches to take one step. On the dispatcher's key shelf, the key K1 and C1 are associated with this device. The dispatcher to select the device 111, operates key K1.

*The impulsing circuit*

Responsive to the operation of key K1, a circuit may be traced from neutral, conductor 69, through spring 32 and its make contact, conductor 68, the normal position contact and wiper 43 of the sender S, spring 47, conductor 61, through the winding of the line relay 123 in the substation S1, spring 152 and its break contact, through the resistance 144 to positive battery. Relay 123 energizes over this circuit. The operation of key K1, and springs 31 removes neutral from the conductor 67, which is connected to the first bank contact over which wiper 43 rotates, for a purpose which will be explained hereinafter. Springs 33 of key K1, prepare a point in the circuit of the supervisory lamp 80, for a purpose which will be also explained hereinafter.

In the intermediate substation, the energization of the line relay 123 closes at springs 150 the circuit for the motor magnet 124 of the switch S1. This motor magnet energizes, preparatory to advancing wipers 120 and 121 one step, and at springs 151 closes a circuit from positive battery through the resistance 144, spring 152 and its break contact, spring 151, conductor 161, through the winding of the relay 125 in the next substation, springs 155, resistance 146 to negative battery. Relay 125 energizes over this circuit. While the relay 125 is shown at the last substation on the trunk, it will be understood that if there are more substations on the trunk, the relay energized would be in the station next adjacent to the intermediate station, and that the line relays in all the intervening stations would be operated prior to the operation of the line relay in the last station S2. The energization of relay 125, closes at springs 153 a circuit of the motor magnet 126 of the switch S2, energizing that magnet, which prepares the armatures to advance the wipers 128 and 129, and at springs 154 closes a circuit from negative battery through resistance 146, springs 155 and its break contact, springs 154, conductor 62, through the line relay 14 of the sender S to neutral, energizing the line relay 14.

Upon energizing, relay 14 closes a circuit from neutral through springs 50 and the winding of the motor magnet 13 to negative, energizing that motor magnet. The energization of magnet 13 prepares to advance the wipers 43 and 44 of the sender one step and the springs 49 closes a circuit from neutral through relays 10 and 11 and 12 in multiple. Relay 12, being quick acting, energizes immediately. Relay 10, being a slow to release relay, indicated on the drawings by the crossed-hatched section at the upper end of the core, energizes slightly afterward. Relay 11, being a slow to operate relay, indicated by the solid portion at the upper end of the core and by the weight on the armature 51, does not energize for an appreciable interval of time.

The energization of relay 12, at springs 47, opens the point in the circuit of the relay 123, permitting that relay to deenergize. The deenergization of relay 123 opens the circuit of the motor magnet 124, which deenergizes and advances the wipers of the switch S1 one step. The wiper 129 now engages its first working bank contacts, which is multipled to the other odd numbered bank contacts and connected through the relay 122 to negative battery, closing the circuit for that relay which energizes. The deenergization of the motor magnet 124, opens springs 151 to open the circuit of relay 124 in the next substation, permitting that relay to deenergize. The deenergization of relay 125 opens the circuit of motor magnet 126, which falls back and advances the wipers of the switch S2 one step into an engagement with their first working contacts. Wiper 129 engages its first working contact, to which the odd numbered contacts and relay 127 are connected, to close the circuit through that relay, which energizes. The deenergization of magnet 126 also opens at springs 154 a point in the circuit of relay 14, permitting that relay to fall back.

The deenergization of relay 14 opens the circuit of motor magnet 13 of the switch S, permitting that magnet to fall back to advance the wipers 43 and 44 one step into engagement with their first working bank contact. Deenergization of the motor magnet 13 opens at springs 49 a point in the circuit of relays 10, 11 and 12, but since relays 10 and 11 are slow operating relays, they do not fall back during the impulsing. Relay 12 falls back and at springs 47 closes the circuit of relay 123 to permit that relay to reenergize.

In the present case, however, the dispatcher has operated key K1, thereby removing neutral potential from the first bank contact engaged by wiper 43 so that relay 123 does not energize but rather the switches S, S1 and S2, and all other switches on the trunk, come to rest on their respective first working bank contacts.

*Supervising and controlling the selected device*

When wiper 120 of the switch S1 engages its first working contact, it completes a circuit from neutral through the winding of relay 104 to negative battery, energizing that relay. Wiper 128 of the switch S2, and the corresponding wipers of all the other switches on the trunk are simultaneously standing on their first bank contacts, however, the switch S1 is the only switch in which this particular bank contact is connected to a selecting relay. The energization of relay 104 closes a circuit from negative battery through the winding of relay 107, spring 135 and its operated position, springs 134, trunk conductor 60, key spring 30 and its break contact, conductor 66, spring 48 and its break contact, wiper 44 and its first working bank contact, through the winding of the supervisory polar relay P1 to neutral. Since it is assumed that the device 111 was resting in this operated position when selected, polar relay P1 is energized in the same direction that it was energized in previously, and no circuit changes are made in the supervisory cabinet. When the selecting switches come to rest relay 10 falls back, momentarily closing a circuit from negative through resistance 56, springs 51, springs 46, conductor 64, through the filament of the lamp 80, key spring 33, conductor 69 to the neutral. Lamp 80 is lighted and remains lighted as long as the relay 11 remains in its operated position, to apprise the dispatcher that the selecting switches are standing opposite the control relay associated with key K1. The dispatcher upon noting that no change was made in the lamps associated with this key knows that the device is in the position corresponding to the setting of the lamp, whereupon he proceeds to change its position by momentarily operating the key K. Responsive to the throwing of this key, a circuit is closed from neutral to springs 45, conductor 65, key spring 30 and its make contact, conductor 60, springs 134, springs 135, through the winding of relay 107 to negative battery. The operation of this key also opens the circuit of the polar relay P1, but since that polar relay is of the type which remains in the position to which it has been set after its magnets are deenergized, no effect is produced. The direct neutral connection to the winding relay 107 operates that relay, which locks itself in series with relay 108 over a circuit traceable from neutral through springs 137, through relay 108, springs 139, through the winding relay 107 to negative battery. Relay 108 energizes in this circuit in series with relay 107 when the key K is restored because relay 108 is no longer shunted at armature 45. The energization of relay 108 closes at springs 140 a circuit from neutral through the right hand winding of the electro-magnetic device 111, to negative battery, energizing the magnet 106, which operates the device. It will be understood, that the magnet 106 actuates the device to throw it to its open position, and to move the toggle springs 135, 136, 137, 138, into the position opposite to that shown on the drawings. When the movement of the device 111 is completed, the locking circuit of relays 107 and 108 is opened at springs 137, and the initial energizing circuit of relay 107 is opened at springs 135. Relays 107 and 108 deenergize. A circuit may now be traced from positive battery through the winding of relay 109, spring 135 and its lower contact, springs 134, thence over the previously traced circuit through the winding of polar relay P1, energizing the polar relay in the opposite direction. The energization of the polar relay in the opposite direction, closes a circuit from positive battery through springs 41, through the lamp 82, through resistance 52 to neutral, a parallel circuit is closed through the lamp 83, key springs 34, through the resistance 52 to neutral. Lamps 82 and 83 light to inform the dispatcher that the device 111 has assumed its open position. The movement of armature 41, short circuits the lamp 81, by connecting both terminals of the lamp to positive battery, so that that lamp is extinguished. The dispatcher upon noting the lighting of the lamps 82 and 83, operates the key C1 to open springs 34 and close springs 35, thereby short circuiting the lamp 83, which now has positive battery connected to its upper terminal over circuit through resistance 53, key springs 35, and the upper terminal of the lamp, and to its lower terminal from springs 41 of the polar relay P1. The movement of the device 111 from its operative to its open position, opens springs 136, thereby opening a point in the circuit over which relay 103 was locked and energized. Relay 103 falls back before the circuit through its lower winding is closed by springs 138 of the device 111. Relay 103 upon falling back at springs 133 and its break contact prepares a point to the circuit of relay 102, however, that circuit is held open at springs 130 of the relay 101 until the selecting switch S1 again returns to its normal position.

It will be noted that should the dispatcher desire to again change the device 111, he merely has to again momentarily close the key K, to close a circuit from neutral through spring 45 and conductor 65, springs 30 and its make contact, conductor 60, to spring 134, to spring 135 and its lower contact through the winding of relay 109 to positive battery. Relay 109 energizes over this circuit, closing springs 141. Relay 109 locks energized from neutral on spring 137 at its lower contact through the winding of relay 110, springs 141, the winding of relay 109 to positive battery. As soon as the dispatcher restores the key K, relay 110, being no longer shunted at armature 45, energizes, and at springs 142 closes a circuit through the operating magnet 105 of the device 111. This magnet energizes, moving the device to its operative position and restoring the springs 135, 136, 137, and 138 to the position shown in the drawings. The movement of these springs again prepares the circuit so that the next time neutral is placed on the conductor 60, the device will be moved back into its open position.

*Stepping is resumed*

When the dispatcher has positioned the device 111 to his satisfaction, he restores the key K1, thereby replacing neutral upon the first bank contact over which wiper 43 of the sender S rotates, to again close the circuit of the relay 123. When the switch S' was moved to its first bank position, a circuit was closed from neutral through wiper 121 and that bank contact, through the winding of relay 122 to negative, energizing the relay 122. The circuit of relay 125, therefore, extends through spring 152 and its make contact through resistance 143 to negative battery instead of the positive battery as in the case of the first pulse. Relay 123 energizes, closing the circuit of motor magnet 124 as before. Motor magnet energizes, and at springs 151 closes a circuit over conductor 161 to line relay 125 of the next substation. When the switch S2 moved to its first bank contact position, relay 127 was energized, and springs 155 moved into engagement with their make contacts so that the circuit of relay 125 includes the resistance 145 and positive battery. Relay 125 having negative battery applied to one of its terminals and positive battery applied to the other terminal, is thereby energized, and closes a circuit for magnet 126. Magnet 126 energizes, closes a circuit from positive battery through resistance 145, springs 155, springs 154, conductor 62, through the winding of relay 14 to neutral, energizing the relay 14. Energization of relay 14 closes a circuit of magnet 13, which energizes and closes the circuit of relays 10, 11, and 12, in the manner hereinbefore pointed out. Relay 12 opens circuit of relay 123 which falls back permitting the switch S1 to advance its wipers one step. Relay 122 is no longer energized and falls back at the end of this step. The deenergization of magnet 124 of the switch S1 deenergizes the relay 125 of the switch S2, permitting the latter switch to advance its wipers one step and deenergize relay 127. The deenergization of magnet 126 opens the circuit of relay 14, and the cycle of stepping is completed. If no other keys are operated, wiper 43 will engage neutral potential until it reaches its normal position, so that the stepping will be resumed and continued until all of the switches have been brought to their respective normal positions.

Each time selecting switches S1 and S2 take a step, they energize a relay such as 104 to connect the operating magnets of a device to the operating conductor 60. Simultaneously the sender S connects the corresponding polar relay to the wiper 44, so that the position of each device is supervised and the switches step over their banks.

*Automatic supervision*

When the sender S and the stepping switches S1 and S2 and the other stepping switches on the trunk get back to their normal position, switch S1 closes the circuit of relay 101, switch S2 closes a circuit of relay 101', and each selector switch on the trunk closes a circuit through a corresponding normal position relay. Since the device 111 has been moved and the relay 103 allowed to restore to its normal position, the energization of relay 101 closes a circuit from neutral through spring 133 and its break contact through the winding of relay 102, springs 130, conductor 60, spring 30 and its break contact, conductor 66, springs 48, wiper 44 and its normal contact, conductor 23, through the winding of relay 17 to negative battery. Relay 17 and 102 energize over this circuit. The energization of relay 102 closes at springs 132 a locking circuit for itself direct to neutral independent of the springs 133. At springs 131, relay 102 re-applies neutral to the mid-point of the winding of relay 103, to reenergize that relay. Relay 103 locks itself through springs 133 to neutral independent of the springs 131.

The energization of relay 17, closes at springs 22 a circuit for relay 16, to energize that relay. Relay 16 at springs 19 closes a circuit to the alarm 15 to apprise the dispatcher of the automatic supervision operation now being started, and relay 16 locks itself energized through springs 20 if the alarm key 18 is thrown to its operated position. At springs 21, relay 17 applies neutral to the normal position contact of the switch S engaged by the wiper 43, to start the switches pulsing in the hereinbefore explained manner. The switches will make a complete revolution bringing their wipers into engagement with each of the bank contacts, to supervise the positions of all of the devices in all of the substations. This automatic supervision is provided, because the devices may be thrown automatically or manually by attendant at the substation, and it is necessary that the dispatcher at the dispatcher's station be informed of the position of each device at all times. Since the means for throwing these devices automatically is not an integral part of the present invention, it has not been shown on the drawings as the device 111 may be any one of a number of well known electro-magnetic devices, which have automatic control features incorporated in them.

While I choose to show my invention in connection with a particular type of apparatus, I have done so by way of example only, as there are many modifications and adaptations, which can be made by one skilled in the art without departing from the scope and spirit of the invention.

Having thus described my invention, what I consider new and desire to have protected by Letters Patent is pointed out in the appended claims.

What is claimed is:

1. In a remote control system, an electromagnetic device having a normal and an operated position, signals individual to said device, a polarized relay for controlling said signals, a main and an auxiliary relay for each position of said device, means for establishing a series circuit for either postive or negative battery through said polar relay and one of the main relays dependent upon the position occupied by the device over which the polar relay is operated, means controlled by the operation of said polar relay for operating said signals to indicate the position of the device, a key, means responsive to the operation of the key for operating said main relay, means controlled by said main relay for preparing a circuit over which the associated auxiliary relay is energized when said key is restored, and means controlled by said auxiliary relay in its energized position for moving said device to its other position.

2. In a remote control system, an electro-magnetic device having a normal and an operated position, signals individual to said device, a polarized relay for controlling said signals, a main and an auxiliary relay for each position of said device, means for establishing a series circuit from either positive or negative battery through said polar relay and one of the main relays dependent upon the position occupied by the device, said polar relay operated over said series circuit, means controlled by said polar relay for operating said signals to indicate the position of the device, a key, means for operating said main relay responsive to the operation of said key, means controlled by said main relay for preparing a circuit over which the associated auxiliary relay is energized when said key is restored, means controlled by said auxiliary relay in its energized position for moving said device to its other position, and means controlled by said device in its new position for reoperating said polar relay to reoperate said signals in accordance with said new position.

3. In a remote control system, an electro-magnetic device having an operated and a normal position, operated and normal position contacts for said device, an operating relay for each position of said device, said relays being connected to opposite poles of battery and each relay being connected to a different one of said contacts, signals individual to said device, circuits for controlling said signals, a polarized relay for controlling said signal circuits, a conductor, means for connecting said polarized relay and one of said operating relays in a series circuit including said conductor and one of said contacts on said device, said polarized relay energizing from either pole of battery over said series circuit to operate said signals over said signal circuits to indicate the position occupied by said device, a key, means for operating said connected operating relay responsive to the operation of said key, an auxiliary relay operated by said operating relay responsive to the restoration of said key, means controlled by said auxiliary relay in its energized position for moving said device to its other position, and circuits controlled by said contacts on said device for substituting the other operating relay in said series circuit, said polarized relay energizing in said last series circuit from the opposite pole of battery to reoperate said signals in accordance with the new position of the device.

4. In a remote control system, an electromagnetic device having an open and a closed position, signals individual to said device, a signal relay for controlling said signals, a main and an auxiliary relay for each position of said device, a series circuit for each of said main relays including said signal relay, means controlled by said device and dependent upon its position for preparing one or the other of said series circuits from positive or negative pole of battery, means for completing said prepared series circuit to operate said signal relay from either pole of battery, means controlled by the signal relay for operating said signals to indicate the position of the device, a circuit for each of said auxiliary relays including its associated main relay, means controlled by said device and dependent upon its position for preparing one or the other of said auxiliary relay circuits, a key, means for operating the main relay included in the said completed series circuit responsive to the operation of said key, means controlled by said main relay for closing its associated auxiliary relay circuit whereby said auxiliary relay is short circuited when the key is in operated position and is energized when said key is restored and means controlled by said auxiliary relay for moving said device to its other position, said first means operated by said device for completing the series circuit of the other main relay for reoperating said signal relay from the opposite pole of battery to reoperate said signals to indicate the new position of said device.

5. In a remote control system, an electromagnetic device having an open and a closed position, signals individual to said device, a signal relay for controlling said signals, a main and an auxiliary relay for each position of said device, means for establishing a series circuit from either positive or negative battery through said signal relay and one of the main relays dependent upon the position occupied by the device, said signal relay operated over said circuit from either pole of battery, means controlled by said signal relay for operating said signals to indicate the position of the device, a key, means for operating said main relay responsive to the operation of said key, means controlled by said main relay for closing a circuit over which the associated auxiliary relay is short-circuited when the key is in operated position and is energized when said key is restored, means controlled by the auxiliary relay in its energized position for moving said device to its other position, means controlled by said device in its new position for opening said first series circuit and for closing another series circuit including the signal relay the other main relay and the opposite pole of battery to reoperate said signal relay to reoperate said signals in accordance with said new position, and additional means controlled by said device for opening the circuit of the operated auxiliary relay and for preparing a circuit for the other auxiliary relay to enable said other auxiliary relay to operate said device back to its original position responsive to the reoperation and restoration of said key.

HARRY E. HERSHEY.